Dec. 10, 1957 D. L. BURDORF 2,816,257

SPEED CONTROL APPARATUS

Filed Aug. 27, 1956 2 Sheets-Sheet 1

INVENTOR.
DONALD L. BURDORF

BY

Christie, Parker & Hale

ATTORNEYS

Dec. 10, 1957 D. L. BURDORF 2,816,257

SPEED CONTROL APPARATUS

Filed Aug. 27, 1956 2 Sheets-Sheet 2

INVENTOR.
DONALD L. BURDORF

BY

Christie, Parker & Hale
ATTORNEYS

United States Patent Office 2,816,257

Patented Dec. 10, 1957

2,816,257

SPEED CONTROL APPARATUS

Donald L. Burdorf, Duarte, Calif., assignor to Consolidated Electrodynamics Corporation, Pasadena, Calif., a corporation of California Application August 27, 1956, Serial No. 606,464

6 Claims. (Cl. 318—45)

This invention relates to automatic speed regulation and, more particularly, is concerned with apparatus for regulating the speed of tape in a tape transport system.

In sound recording and reproducing systems, such as magnetic tape recording systems, it is well known that drive speed must be carefully regulated to get maximum fidelity of reproduction. Any changes in speed of the drive are reproduced as changes in frequency of the recorded signals. As described in co-pending application Serial No. 451,029, filed August 19, 1954, in the name of Monte L. Marks, the speed of the tape may be controlled by providing a signal having a constant frequency and recording it as a reference frequency signal on the tape along with other recorded information. On play-back, the tape reference signal is compared with a constant frequency reference signal to provide an error voltage for controlling the speed of the tape through a servo motor. By controlling the tape reference signal to have the same frequency during play-back, the tape is made to move at a speed required to reproduce the information signals on the tape at the same frequencies at which they were recorded on the tape.

In a tape speed regulating system of this type it has been found necessary to compensate both for long term drifts in the frequencies of the output signals from the tape, as well as to compensate for rapid or short term variations in the frequency. The former type of frequency variations may be due to expansion or contraction of the tape with temperature. Thus, the tape may be recorded at a different temperature than that at which it is played back. This must be compensated for by driving the tape at slightly higher speed during play-back. The short term variations may be caused by mechanical stretching of the tape due to variations in load, or due to hunting or vibrations in the mechanical drive system itself.

According to the present invention, speed regulation of the tape drive is achieved by means of two servo motors controlled in response to variations in frequency of an output signal derived from a reference frequency signal recorded on the tape. The main tape drive is effected by means of a primary motor which drives, through a suitable fluid linkage, a capstan engaged with the tape. One servo motor is arranged to provide a variable load on the primary motor to regulate the average speed of the tape drive, while the other servo motor is coupled directly to the capstan and is arranged to provide instantaneous accelerations and decelerations of the capstan to correct substantially instantaneously for rapid short term variations in the output frequency derived from the reference signal.

For a better and more complete understanding of the invention and its operation, reference should be had to the accompanying drawing, wherein Fig. 1 is a schematic block diagram of the tape drive and speed regulating system of the present invention;

Figure 1:
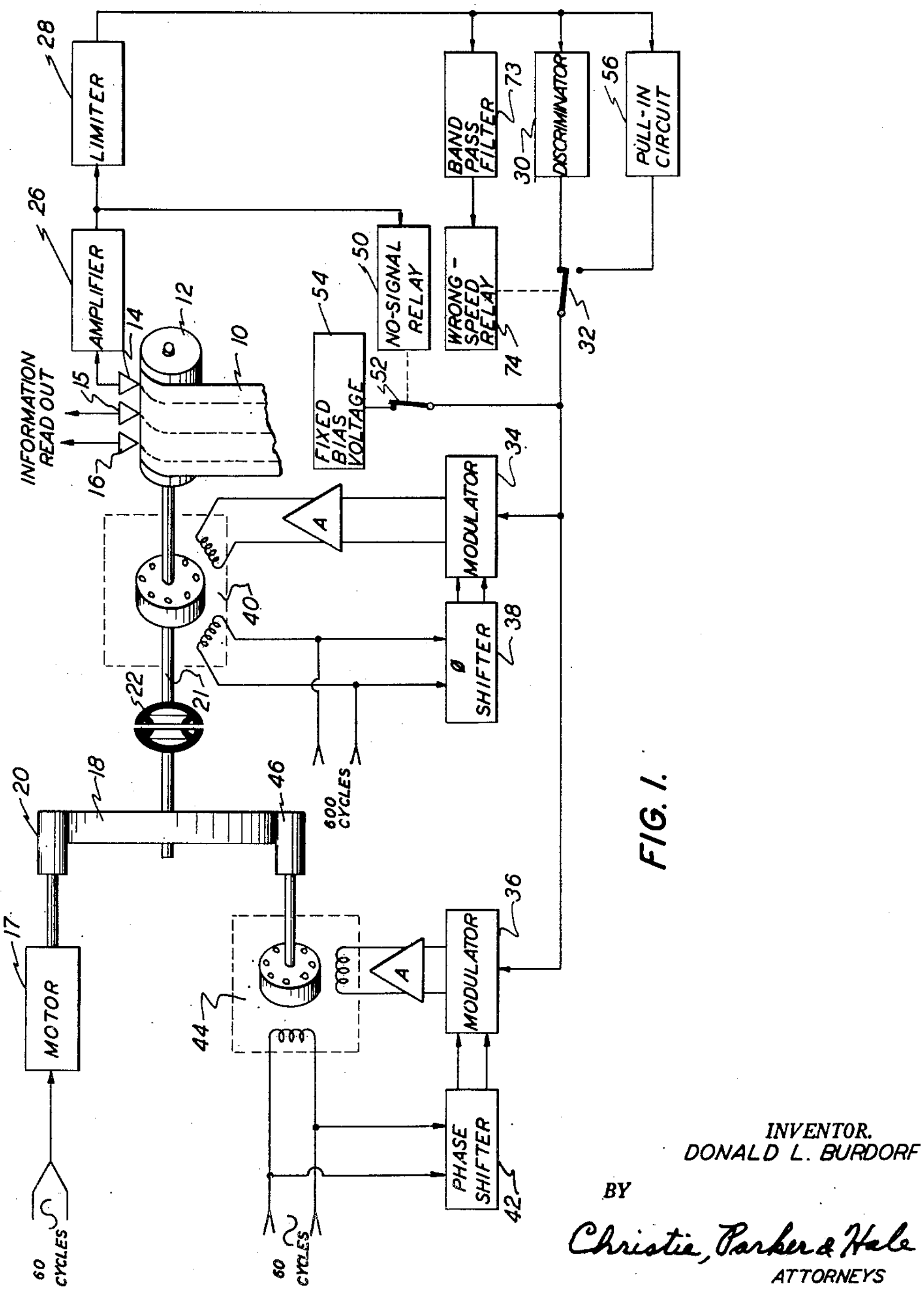

Referring in detail to Fig. 1, the numeral 10 indicates generally a recording medium, such as magnetic tape, which is preferably driven by frictional engagement with a capstan 12. The magnetic tape 10 is provided with at least two tracks, there being shown three tracks by way of example in Fig. 1. Each track is provided with a suitable read-out head, such as indicated at 14, 15 and 16. One track on the tape is provided with a single frequency reference signal which has previously been recorded on the tape with other information recorded on the other information tracks on the tape. The frequency of the reference signal on play-back provides a means of sensing variations in the play-back speed of the tape 10 in reference to the speed at which it was recorded.

Figure 2:
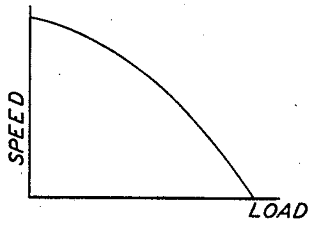
Fig. 2 is a diagram showing the performance characteristic of the main drive motor.

Rotation of the capstan 12 is produced by means of a suitable alternating current motor 17. The output shaft of the motor 17 drives a flywheel 18 by means of a capstan 20 which engages the outer edge of the flywheel 18. The motor 17 preferably has a speed versus load characteristic as shown in Fig. 2. Thus, the speed of rotation of the motor 17 varies substantially linearly with changes in load thereon.

The flywheel 18, which is rotated at considerably reduced speed by means of the speed reduction effected by the relative diameters of the flywheel 18 and the capstan 20, is coupled to the capstan 12 through a fluid coupling 22.

Regulation of the speed of the capstan 12 is achieved by coupling the output from the head 14, which senses the reference signal on the tape 10, to a suitable amplifier 26. The amplified signal from the amplifier 26, which is preferably of the order of 10,000 cycles when the capstan is operating at proper speed, is passed through an amplitude limiter 28 and coupled to a frequency discriminator 30. The discriminator 30 may be of any suitable type, such as a Foster-Seeley discriminator circuit, which is tuned to the same frequency at which the reference signal on the tape 10 was recorded. The discriminator 30 provides an output error voltage which varies in magnitude and polarity with changes in frequency of the input above and below the tuned center frequency of the discriminator 30.

The output voltage from the discriminator 30 is coupled by means of the relay-operated switch 32 to a conventional balanced modulator 34 and a similar balanced modulator 36. The modulator 34 has coupled thereto a reference signal derived from a 600-cycle source (not shown) through a phase shifter 38. The modulator 34 produces a 600-cycle output signal that reverses in phase with changes in polarity of the D.-C. voltage from the discriminator 30.

The output of the modulator 34, as well as the 600-cycle reference signal, is applied to a two-phase A.-C. servo motor 40, the rotor of which is carried on the shaft 21 between the fluid coupler 22 and the capstan 12. The effect of the servo motor 40 is to provide immediate change in torque applied to the shaft driving the capstan 12 in response to an error voltage developed at the output of the discriminator 30. The phase shifter 38 is of such a value as to provide the required phase quadrature relationship between the two signals applied to the servo motor 40.

The modulator 36 has coupled thereto a 60-cycle reference signal from a suitable source (not shown) through a phase shifter 42. The output of the modulator 36 is coupled with the 60-cycle reference voltage to a two-phase A.-C. servo motor 44. The output shaft of the servo motor 44 drives a capstan 46 which frictionally engages the flywheel 18. The effect of the servo motor 44 is to directly vary the load imposed on the motor 17. Because the servo motor 44 is rotated at much higher speed than the servomotor 40, it does not respond to the smaller and more rapid variations in the output voltage from the discriminator 30, such as does the servomotor 40. The effect of the servomotor 44 is to impose a substantially constant load on the motor 17 necessary to maintain the average speed of rotation of the capstan 12 at the necessary level to maintain the output of the discriminator 30 at substantially a zero level. Because of the characteristic of the motor 17, as shown by the diagram of Fig. 2, changes in speed of the capstan 12 can be made substantially directly proportional to changes in torque of the servomotor 44.

The servomotor 40, by operating at 600 cycles and by being directly coupled to the low speed shaft driving the capstan 12, can make extremely rapid accelerations and decelerations in quickly correcting the speed of the capstan 12. By virtue of the fluid coupling 22, the inertia of the system driven by the servo motor 40 can be maintained relatively low so that speed corrections can be made with a minimum of applied torque by the servo motor 40.

Since the starting torque of the motor 17 may be relatively small, and since normally there is no output voltage derived from the discriminator 30 unless there is a signal applied to the input, means is provided for initially operating the servo motors 40 and 44 to assist the motor 17 in bringing the capstan 12 up to the required speed. This is accomplished by a no-signal relay 50 which is actuated by the output from the amplifier 26. The relay 50 drives a switch 52 which normally connects a fixed bias voltage from a bias voltage source 54 to the input to the modulators 34 and 36. The polarity of the bias voltage is such that the torque developed by the servo motors 40 and 44 assists the motor 17 in accelerating the tape drive up to the desired operating speed. As soon as the tape begins to move, a signal is developed at the output of the amplifier 26 which energizes the no-signal relay 50 thereby actuating the relay switch 52 to disconnect the fixed bias voltage from the modulators 34 and 36.

Figure 3:
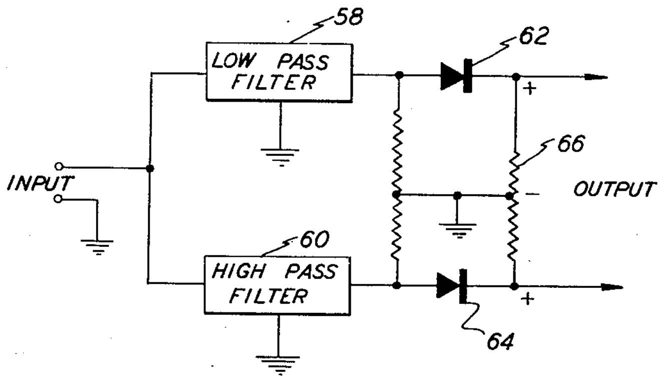
Fig. 3 is a schematic block diagram of a suitable pull-in circuit for use in the system of Fig. 1.
Figure 4:
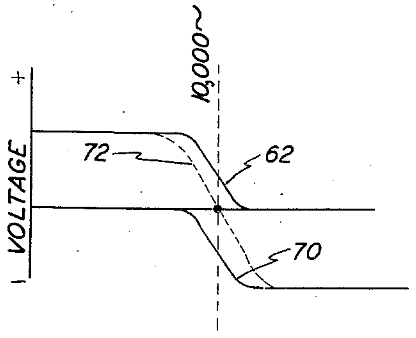
Fig. 4 is a diagram used in explaining the operation of the pull-in circuit of Fig. 3.

Because the discriminator 30 provides the proper operating characteristic only within a limited frequency range about the tuned center frequency, a special pull-in circuit 56 is provided which is coupled to the output of the limiter 28. A suitable pull-in circuit is shown in more detail in Fig. 3 and preferably comprises a low-pass filter 58 and a high-pass filter 60, the outputs of which are coupled by diodes 62 and 64 across a center-tapped resistor 66. The characteristic of the low-pass filter 58 is such that at frequencies below 10,000 cycles, a D.-C. voltage is developed across half of the resistor 66 by virtue of the diode 62. As the frequency of the input increases, the low-pass filter begins to cut off in the region of 10,000 cycles. The voltage developed across the resistor 66 as a function of input frequency by the low-pass filter 58 is shown by the curve 68 in Fig. 4.

The characteristic of the high-pass filter 60 is such that it begins to pass frequencies in the region of 10,000 cycles and above. As a result a D.-C. voltage of opposite polarity is produced across the resistor 66 which varies as a function of frequency as shown by the curve 70 in Fig. 4. The resultant sum of the voltages developed in response to the low-pass filter 58 and high-pass filter 60 is shown by the dotted line 72 in Fig. 4. It will thus be apparent that a voltage is developed across the resistor 66 which reverses in polarity in the region of 10,000 cycles.

The output of the pull-in circuit 56 is coupled by means of the relay-operated switch 32 to the modulators 34 and 36. The switch 32 is operated by a wrong-speed relay 74 controlled by the output of a band pass filter 73 tuned to 10,000 cycles. As soon as a signal is developed at the output of the limiter 28, the pull-in circuit 56 develops a voltage which is applied to the modulators 34 and 36.

Thus, a torque is applied to the drive system by the servo motors 40 and 44 which continues to aid the motors 17 until the capstan begins to reach a speed at which the output from the amplifier 26 approaches 10,000 cycles. As the signal approaches 10,000 cycles, the output from the filter 73 increases to a value sufficient to actuate the relay 74, connecting the output of the discriminator 30 through the relay-operated switch 32 to the modulators 34 and 36. The discriminator 30 is much more sensitive in operation about the center frequency of 10,000 cycles, and therefore provides much more sensitive control once the drive system has come up to proper speed.

It should be noted that while a particular servo circuit has been shown for operating the servos 40 and 44, the invention is not limited to the particular circuit shown. For example, a follow-up servo, such as described in the above-mentioned co-pending application may be used in which a chopper alternately connects the input to the discriminator to a reference oscillator and to the signal derived from the reference track on the tape. Other modifications also are possible without departing from the scope of the invention. For example, a phase detector with a 10,000 cycle reference source could be used in place of the discriminator circuit 30.

From the above description it will be seen that an improved speed regulated drive for playing back information recorded on a tape has been described. The drive arrangement provides means for correcting for rapid variations or flutters in the speed of the tape, and at the same time provides means for correcting for long term variations in required speed of the tape. The double servo motor arrangement has the particular advantage that one servo motor does not have to correct both for short term and long term variations in the required speed of the drive system.

It will be appreciated that while the speed regulating system has been particularly described in a system for driving magnetic tape, it may be useful in other types of drive systems, such as driving a turn-table for disc type recordings. In such case the reference signal need not necessarily be derived from the recording disc itself but may be derived from separate means for developing a signal whose frequency is a function of the rotational speed of the turn-table. For example, in such case the reference signal might be derived from black and white index markings around the circumference of the turn-table which are detected by suitable phototube means in conventional manner.

What is claimed is:

1. Apparatus for controlling the speed of a tape having a reference frequency signal recorded thereon, comprising a primary motor, a first servo motor, and a second servo motor; a rotatable member for moving the tape; drive means coupling the primary motor, and the first and second servo motors to the rotatable member, said drive means including means for maintaining the rotational speed of the primary and first servo motor at a predetermined multiple of the second servo motor and the rotatable member; means responsive to said reference signal recorded on the tape for generating an error signal indicative of the deviations in the signal frequency from a predetermined value; means for controlling the direction and amount of the torque developed by the first servo motor in response to said error signal; and means for controlling the direction and amount of the torque developed by the second servo motor in response to said error signal.

2. Apparatus for controlling the speed of a driven member, comprising a primary motor, a first servo motor, and a second servo motor; drive means coupling the primary motor, and the first and second servo motors to the driven member, said drive means including means for maintaining the rotational speed of the primary and first servo motor at a predetermined multiple of the second servo motor; means responsive to the speed of the driven member for generating an error voltage indicative of the deviation of the speed of the driven member from a predetermined value; means for controlling the direction and amount of the torque developed by the first servo motor in response to said error signal; and means for controlling the direction and amount of the torque developed by the second servo motor in response to said error signal.

3. A regulated speed drive for controlling the speed of a driven member, comprising means for generating a periodic reference signal having a frequency proportional to the speed of the driven member, a motor having a speed that varies substantially with the load thereon, a flywheel driven by the motor, fluid coupling means coupling the flywheel to the driven member, a first servo motor, means for coupling the first servo motor to the flywheel, a second servo motor, means for coupling the second servo motor to the driven member, whereby the first and second servo motors are coupled on opposite sides of the fluid coupling means, means for generating an error signal that changes in magnitude and polarity with changes in the frequency of said reference signal about a fixed predetermined value, and means for varying the direction and magnitude of the torque of the first and second servo motors in response to said error signal.

4. A regulated speed drive for controlling the speed of a driven member, comprising means for generating a periodic reference signal having a frequency proportional to the speed of the driven member, a drive member having a speed that varies substantially with the load thereon, fluid coupling means coupling the drive member to the driven member, a first servo motor, means for coupling the first servo motor to the drive member, a second servo motor, means for coupling the second servo motor to the driven member, whereby the first and second servo motors are coupled on opposite sides of the fluid coupling means, means for generating an error signal that changes in magnitude and polarity with changes in the frequency of said reference signal about a fixed predetermined value, and means for varying the direction and magnitude of the torque of the first and second servo motors in response to said error signal.

5. A regulated speed drive for controlling the speed of a driven member, comprising means for generating a periodic reference signal having a frequency proportional to the speed of the driven member, a drive member having a speed that varies substantially with the load thereon, flexible coupling means coupling the drive member to the driven member, a first servo motor, means for coupling the first servo motor to the drive member, a second servo motor, means for coupling the second servo motor to the driven member, whereby the first and second servo motors are coupled on opposite sides of the flexible coupling means, means for generating an error signal that changes in magnitude and polarity with changes in the frequency of said reference signal about a fixed predetermined value, and means for varying the direction and magnitude of the torque of the first and second servo motors in response to said error signal.

6. Apparatus as defined in claim 5 including means for applying a large error voltage in the absence of the reference signal to said means for controlling the torque of the servo motors, whereby a large accelerating torque is applied to the driven member in starting.

No references cited.